United States Patent Office  
3,183,250  
Patented May 11, 1965

3,183,250  
EPOXIDES FROM ETHYLENIC COMPOUNDS CONTAINING ELECTRON-WITHDRAWING GROUPS  
David H. Rosenblatt, Baltimore, Md., and Gordon H. Broome, Gastonia, N.C., assignors to the United States of America as represented by the Secretary of the Army  
No Drawing. Filed June 5, 1962, Ser. No. 200,288  
3 Claims. (Cl. 260—348)  
(Granted under Title 35, U.S. Code (1952), sec. 266)

The invention described herein may be manufactured and used by or for the Government of the United States of America for governmental purposes without the payment to us of any royalty thereon.

This invention relates to a new class of compounds designated by the formula

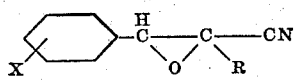

where X is H, F, Cl, or Br; R is —C≡N or —CO—NH$_2$. The compounds of the above formula are useful as monomers to prepare resins. For example, they can polymerize in the presence of acid catalysts to a hard infusible resin in a manner well known in the art. The compound 2,2-dicyano-3-o-chlorophenyl oxirane has been found to be a strong vesicant, and therefore useful as a chemical warfare agent.

The ethylenic starting materials for the herein described process are described in or can be made by the methods disclosed by Corson et al., Journal of the American Chemical Society 50: 2825 (1928).

The process consists of reacting the ethylenic compounds corresponding to the final products with a hypochlorite ion generating material in an inert solvent at a pH in the range 3–9. Best results are obtained at a pH of 7. However, the reaction is operable in the broader range. The temperature range is not critical and can be from 0°–80° C.

For the purpose of this invention, we define a hypochlorite ion generating material as on which is capable of furnishing hypochlorite ions in an aqueous solution. Non-limiting examples of such materials are hypochlorous acid, sodium hypochlorite, lithium hypochlorite, calcium hypochlorite and neutral chlorine water.

The inert solvents which may be used are acetonitrile, water, dioxane, and tetrahydrofuran.

We have found that instead of obtaining a chlorohydrin as one would expect from the work of Colonge, Bull. Soc. Chim. France 838–841 (1947) in which mesityl oxide was reacted with hypochlorous acid over a pH range of 4.5 to 10 to obtain the corresponding chlorohydrin, one can obtain oxirane compounds from ethylenic compounds having strong electron-withdrawing substituents. Thus, our process can be applied to olefins that are substituted by at least two strong electron-withdrawing groups. Examples of these possible starting materials are:

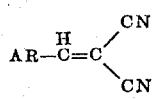

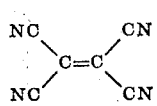

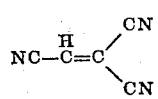

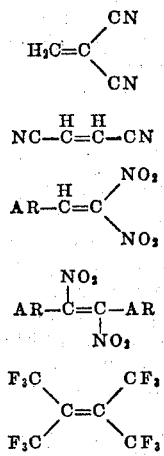

where AR is the phenyl radical or the phenyl radical substituted with halogen, nitro, cyano, carboxymethyl, acetyle, perchloryl or trialkylammonio radicals.

The reaction appears to following the following scheme:

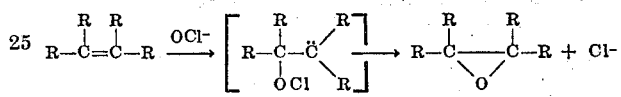

We carried out various experiments in order to define the role of the hypochlorite ion in this reaction. In the pH range where the hypochlorite ion-hypochlorous acid equilibrium is shifted predominantly to the side of the latter species, the reaction rate which is constant at a given analytical concentration of hypochlorous acid increases proportionately to the increase in hydroxy ion and hence proportionately with increasing hypochlorite ion concentration. At constant pH, within the same range as above, an increase in the analytical concentration of hypochlorous acid produces a proportional increase in the reaction rate constant.

These two pieces of experimental evidence, coupled with the fact that the reversal of the chlorohydrination reaction has never been reported and is highly improbable, leave the above postulated mechanism as the sole acceptable one for the present invention.

During the course of the reaction the pH is measured by a pH meter equipped with calomel and glass electrodes. The pH of the reaction mixture is measured periodically and when it remains approximately constant for one-half hour, the reaction is considered to be complete.

*Example I*

Solutions of 234 ml. of 0.141 molar aqueous hypochlorous acid and 47 ml. of 1 N sodium hydroxide are added concurrently to a solution of 5.66 grams of 1,1-dicyano-2-o-chlorophenyl ethylene in 270 ml. of acetonitrile, at such a rate as to maintain the pH of the mixture in the vicinity of 7. When the reaction is complete, as is evidenced by the pH remaining constant for one-half hour, a little sodium chloride is added and the mixture is extracted with two portions of ether (250 and .125 ml.). The combined ether extract is concentrated to remove all ether, leaving an oily residue, which is steam distilled. The oil collected in the steam distillate is crystallized from petroleum ether to give 2,2-dicyano-3-o-chlorophenyl oxirane, melting at 51–52° C. and weighing 2.2 grams.

From the above examples it is evident that when the mole ratio of hypochlorite ion to olefine material is equimolar the reaction proceeds only through to the epoxidation stage. With increasing amounts of hypochlorite ion, i.e., a molar excess, a cyano group is concurrently hydrolyzed to an amido group.

*Example II*

Chlorine water is adjusted to pH 7 with sodium hydroxide to give a 0.121 M hypochlorite solution. A 225 ml. portion of this is added to a solution of 2.93 grams of 1,1-dicyano-2-o-chlorophenyl ethylene in 100 ml. of acetonitrile. The pH, measured by a portable pH meter, drops quickly to about 3 and is raised with about 14 ml. of 1 N sodium hydroxide, which, unless care is taken, may raise the pH to 11, in which case the pH is adjusted to 7 quickly with 0.1 N hydrochloric acid. The solvent is evaporated to dryness at reduced pressure and the residue is washed with ether, then with water, and then extracted with boiling ether. The extract is filtered and evaporated to dryness to give a solid residue which is recrystallized from benzene, yielding 0.43 gram of a compound, one of the isomers of 2-carboxamido-2-cyano-3-o-chlorophenyl oxirane, which melts at 189–190° C.

Calculated for $C_{10}H_7O_2N_2Cl$: C, 53.9; H, 3.17; O, 14.4. Found: C, 54.2; H, 3.2; O, 13.9.

From the above ether washings, by two fractional precipitations from benzene, followed by one recrystallization from chloroform-carbon tetrachloride and two recrystallizations from chloroform, 0.08 gram of second isomer of 2-carboxamido-2-cyano-3-o-chlorophenyl oxirane is isolated, M.P. 138–140° C. This was analyzed as: C, 53.89; H, 3.2; O, 13.8.

We claim:
1. The compound selected from the group consisting of 2,2-dicyano-3-o-chlorophenyl oxirane and 2-cyano-2-carboxamido-3-o-chlorophenyl oxirane.
2. 2,2-dicyano-3-o-chlorophenyl oxirane.
3. 2-cyano-2-carboxamido-3-o-chlorophenyl oxirane.

References Cited by the Examiner

UNITED STATES PATENTS

| | | | |
|---|---|---|---|
| 1,492,969 | 5/24 | Dunstan | 260—348.6 |
| 2,046,469 | 7/36 | Langedijk | 260—348.6 |
| 2,724,719 | 11/55 | Markley et al. | 260—348 |
| 2,730,531 | 1/56 | Payne et al. | 260—348 |
| 2,776,982 | 1/57 | Handley | 260—348.6 |
| 2,888,466 | 5/59 | Nichols et al. | 260—348 |
| 2,891,970 | 6/59 | Frank et al. | 260—348.6 |
| 3,053,857 | 9/62 | Payne | 260—348 |

FOREIGN PATENTS 735,990   8/55   Great Britain.

WALTER A. MODANCE, *Primary Examiner.*

NICHOLAS S. RIZZO, *Examiner.*